(12) United States Patent
Yang et al.

(10) Patent No.: US 9,766,622 B1
(45) Date of Patent: Sep. 19, 2017

(54) METHOD FOR CONTROLLING UNMANNED AERIAL VEHICLE USING REMOTE TERMINAL

(71) Applicant: ZEROTECH (Shenzhen) Intelligence Robot Co., Ltd, Shenzhen (CN)

(72) Inventors: Jianjun Yang, Beijing (CN); Kaiben Sun, Beijing (CN); Bin Cheng, Beijing (CN); Wanhong Cai, Beijing (CN)

(73) Assignee: ZEROTECH (SHENZHEN) INTELLIGENCE ROBOT CO., LTD, Longgang District, Shenzhen (CN)

( * ) Notice: Subject to any disclaimer, the term of this patent is extended or adjusted under 35 U.S.C. 154(b) by 0 days.

(21) Appl. No.: 15/197,802

(22) Filed: Jun. 30, 2016

(30) Foreign Application Priority Data

Apr. 15, 2016 (CN) .......................... 2016 1 0237803

(51) Int. Cl.
*G05D 1/00* (2006.01)
*B64C 39/02* (2006.01)
*B64D 47/08* (2006.01)

(52) U.S. Cl.
CPC ......... *G05D 1/0016* (2013.01); *B64C 39/024* (2013.01); *B64D 47/08* (2013.01); *G05D 1/0011* (2013.01); *G05D 1/0038* (2013.01); *B64C 2201/146* (2013.01)

(58) Field of Classification Search
CPC G05D 1/0011; G05D 1/0016; B64C 39/0024; B64D 47/08
See application file for complete search history.

(56) References Cited

U.S. PATENT DOCUMENTS

| | | | | |
|---|---|---|---|---|
| 8,903,568 B1* | 12/2014 | Wang | ...................... | B64C 19/00 244/189 |
| 9,387,927 B2* | 7/2016 | Rischmuller | ......... | B64C 39/024 |
| 9,493,232 B2* | 11/2016 | Wang | ...................... | B64C 19/00 |
| 2014/0008496 A1* | 1/2014 | Ye | ........................... | B64C 13/20 244/190 |
| 2015/0057844 A1* | 2/2015 | Callou | ................. | G05D 1/0204 701/3 |
| 2015/0142213 A1* | 5/2015 | Wang | ...................... | B64C 19/00 701/2 |
| 2015/0149000 A1* | 5/2015 | Rischmuller | ......... | B64C 39/024 701/7 |
| 2015/0179219 A1* | 6/2015 | Gao | .................... | G06K 9/00664 386/278 |

(Continued)

OTHER PUBLICATIONS

"Input Events," developer.android.com, web archive dated Feb. 19, 2014, [online], [available:https://web.archive.org/web/20140219031304/http://developer.android.com/guide/topics/ui/ui-events.html].*

(Continued)

*Primary Examiner* — Thomas G Black
*Assistant Examiner* — Peter D Nolan
(74) *Attorney, Agent, or Firm* — Jun He Law Offices P.C.; James J. Zhu

(57) ABSTRACT

A method for controlling a UAV using a remote terminal. The remote terminal is capable of wirelessly communicating with the UAV. The method comprises detecting, via a physical input device of the remote terminal, at least one user's action applied to the physical input device; generating a control instruction in response to the detected at least one user's action; and transmitting the control instruction to the UAV.

16 Claims, 4 Drawing Sheets

(56) References Cited

U.S. PATENT DOCUMENTS

| | | | | |
|---|---|---|---|---|
| 2015/0268666 | A1* | 9/2015 | Wang | B64C 19/00 |
| | | | | 701/2 |
| 2015/0370250 | A1* | 12/2015 | Bachrach | G05D 1/0016 |
| | | | | 701/2 |
| 2016/0070264 | A1* | 3/2016 | Hu | G08G 5/0069 |
| | | | | 701/2 |
| 2016/0132052 | A1* | 5/2016 | Seydoux | G05D 1/0022 |
| | | | | 701/2 |
| 2016/0139595 | A1* | 5/2016 | Yang | G05D 1/0016 |
| | | | | 701/2 |
| 2016/0159463 | A1* | 6/2016 | Wang | B64C 19/00 |
| | | | | 701/2 |
| 2016/0191793 | A1* | 6/2016 | Yang | H04N 5/23222 |
| | | | | 348/207.11 |
| 2016/0241767 | A1* | 8/2016 | Cho | H04N 5/23203 |
| 2016/0297545 | A1* | 10/2016 | Yang | G05D 1/0011 |
| 2016/0327950 | A1* | 11/2016 | Bachrach | G05D 1/0016 |
| 2016/0360087 | A1* | 12/2016 | Kwon | H04N 5/23229 |

OTHER PUBLICATIONS

K. Perez, "Android SDK: Intercepting Physical Key Events," web archive dated Jun. 4, 2014, [online], [available: https://web.archive.org/web/20140604063133/http://code.tutsplus.com/tutorials/android-sdk-intercepting-physical-key-events--mobile-10379].*

A. Henry, "How to Remap the Hardware Buttons on Your Android Phone," web archive dated Oct. 10, 2013, [Online], [Available: https://web.archive.org/web/20131010111330/http://lifehacker.com/how-to-remap-the-hardware-buttons-on-your-android-phone-1443192245].*

* cited by examiner

METHOD FOR CONTROLLING UNMANNED AERIAL VEHICLE USING REMOTE TERMINAL

CROSS REFERENCE TO RELATED APPLICATIONS

This application claims priority to Chinese Patent Application No. 201610237803.8 filed on Apr. 15, 2016, the entire content of which is incorporated herein by reference.

TECHNICAL FIELD

The present application relates to unmanned aerial vehicle (UAV) technology, and more particularly to a method for controlling a UAV using a remote terminal.

BACKGROUND

An unmanned aerial vehicle (UAV), also referred to as an unmanned drone or drone, is an aircraft that does not carry a human operator and is remotely piloted by a remote terminal operated by an operator on the ground.

In order for operation of the UAV(s), an operator of the UAV generally needs to send various control instructions to the UAV using a remote terminal. In certain applications, the remote terminal may run a special application, and have a touch screen capable of displaying a graphic user interface (GUI) with several virtual input buttons. By touching on the virtual input buttons displayed on the touch screen, the operator can enter inputs corresponding to desired control instructions. For example, the graphic interface may include a virtual input button corresponding to a taking-off instruction for the UAV, and the taking-off instruction can be transmitted from the remote terminal to the UAV immediately after the operator touches the virtual input button.

However, in some environments such as under a cold temperature (e.g. below −30 degree-C) or when a surface of the touch screen is wet (e.g. when it rains), the touch screen may not respond to the operator's touch actions correctly, which adversely affects the operation of the remote terminal and the UAV.

Furthermore, the flight of the UAV in the air is three-dimensional and may have at most six degrees of freedom, including three degrees of freedom for linear movement and three other degrees of freedom for rotatory movement. However, the touch screen is a two-dimensional input device and thus can only sense a one-dimensional or two-dimensional touch action. Thus, it is difficult to control the flight of the UAV using the touch screen.

Thus, there is a need for further improvements.

SUMMARY

An objective of the present application is to provide a remote terminal which provides more convenience in controlling a UAV.

In a first aspect of the present application, there is disclosed a method for controlling a UAV using a remote terminal. The remote terminal is capable of wirelessly communicating with the UAV. The method comprises detecting, via a physical input device of the remote terminal, at least one user's action applied to the physical input device; generating a control instruction in response to the detected at least one user's action; and transmitting the control instruction to the UAV.

In a second aspect of the present application, there is disclosed a remote terminal for controlling a UAV, wherein the remote terminal is capable of wirelessly communicating with the UAV, and comprises a physical input device for detecting at least one user's action applied thereto; a processor for generating a control instruction in response to the detected at least one user's action; and a communication device for transmitting the control instruction to the UAV.

The foregoing has outlined, rather broadly, features of the present application. Additional features of the present application will be described, hereinafter, which form the subject of the claims of the present application. It should be appreciated by those skilled in the art that the conception and specific embodiments disclosed herein may be readily utilized as a basis for modifying or designing other structures or processes for carrying out the objectives of the present application. It should also be realized by those skilled in the art that such equivalent constructions do not depart from the spirit and scope of the present application as set forth in the appended claims.

BRIEF DESCRIPTION OF THE DRAWINGS

The aforementioned features and other features of the present application will be further described in the following paragraphs by referring to the accompanying drawings and the appended claims. It will be understood that, these accompanying drawings merely illustrate certain embodiments in accordance with the present application and should not be considered as limitation to the scope of the present application. Unless otherwise specified, the accompanying drawings need not be proportional, and similar reference characters generally denote similar elements.

DETAILED DESCRIPTION OF THE PREFERRED EMBODIMENTS

The following detailed description refers to the accompanying drawings as a part of the present application. Unless otherwise stated in the context, similar symbols generally represent similar components in the accompanying figures. The illustrative embodiments described in the detailed description, the accompanying drawings and the claims are not limiting, and other embodiments may be adopted, or modifications may be made without deviating from the spirit and subject of the present application. It should be understood that, the various aspects of the present application described and graphically presented herein may be arranged, replaced, combined, divided and designed in many different configurations, and these different configurations are implicitly included in the present application.

Figure 1:
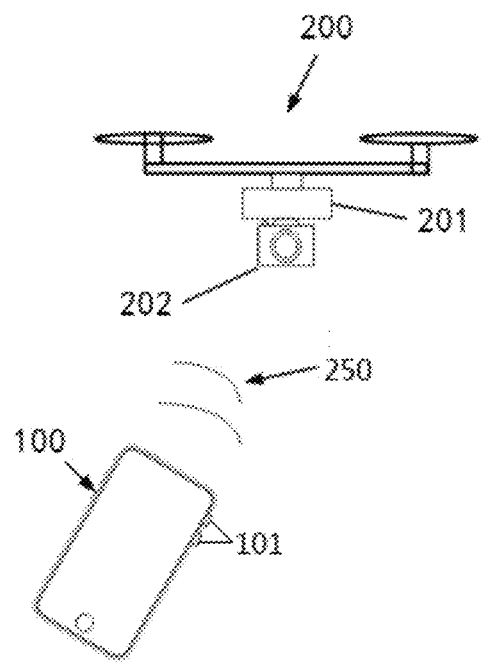
FIG. 1 shows an exemplary UAV system according to an embodiment of the present application.

FIG. 1 shows an exemplary UAV system according to an embodiment of the present application.

As shown in FIG. 1, the UAV system includes a UAV 200 having a payload platform 201 which is used to attach a payload 202 such as a camera or the like to the UAV 200. The UAV 200 can fly as desired by an operator or a user of the UAV 200, and capture images such as video images or streams during its flight in the air.

The UAV system further includes a remote terminal 100. The remote terminal 100 can transmit various control instructions to the UAV 200 via a wireless communication 250, responsive to user inputs entered by the operator. Accordingly, the UAV 200 can receive the control instructions from the remote terminal 100, and respond to the control instructions to fly, capture images or implement other types of operations. The remote terminal 100 has a display which presents a graphic user interface (GUI) for presenting various information to the operator, such as flight-related information and video image captured by the camera 202 on the UAV 200. The display may be a touch screen which is capable of detecting user's touch actions, for example, on a virtual control button on a specific region of the touch screen.

The remote terminal 100 further includes one or more physical input devices 101 which are also used to detect user' actions relating to the instruction or data inputs. The physical input devices 101 may be physical keys, buttons, switches, track balls, keyboards or other similar input devices. The physical input devices 101 have tangible physical structures, and thus it is more convenient and sensible for the operator to operate these devices 101 compared with the touch screen. Also, as a further advantage of providing the physical structures, the physical input devices 101 are more reliable in functionality and operation, especially in severe environments such as under a cold temperature or in a rainy weather.

Some types of physical input devices may be integrated within the remote terminal 100, such as the input device 101 shown in FIG. 1.

As shown in FIG. 1, the remote terminal 100 is designed as a mobile phone-like structure, and accordingly sound volume adjusting keys, a power on/off key, a home key, and/or a screen-locking key may be integrated within the remote terminal 100, functioning as the physical input devices. Such keys may have respective predetermined or configurable functions, which may be originally defined by an operating system of the remote terminal 100. For example, the sound volume adjusting keys can be used to adjust the sound volume of a speaker of the remote terminal 100; and the power on/off key may be used to turn on or off the power of the remote terminal 100. Some remote terminal allows further configuration or extensions of the functions achieved by these physical keys. Alternatively, some physical input devices may be formed as separate components, which are releasably attached to the remote terminal 100. For example, the physical input device may be formed as a keyboard attachable to the remote terminal 100 via an I/O port such as a Universal Serial Bus (USB) port, or may be formed as volume adjusting keys integrated within an earphone line attachable to the remote terminal 100 via an earphone connection port.

Figure 2:
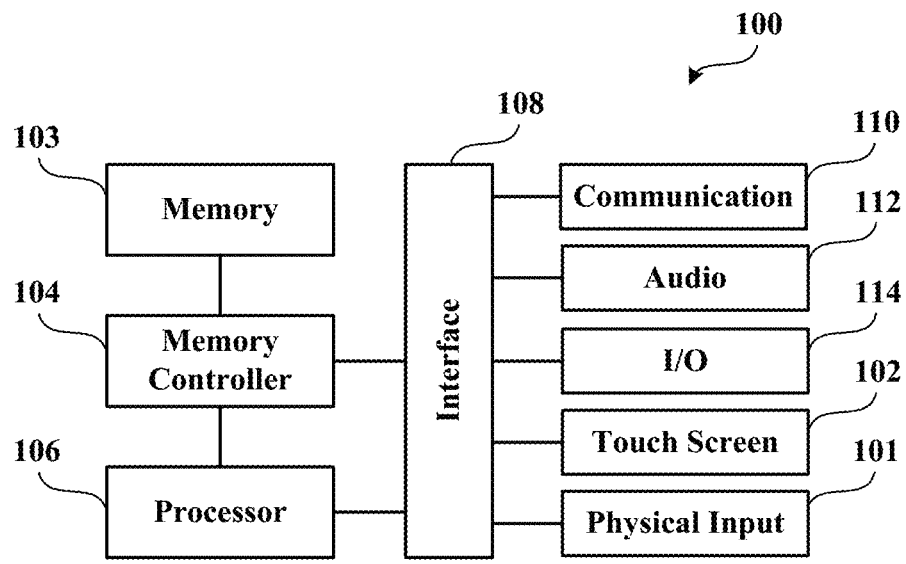
FIG. 2 shows a block diagram of the remote terminal 100 in FIG. 1 according to an embodiment of the present application.

FIG. 2 shows a block diagram of the remote terminal 100 in FIG. 1 according to an embodiment of the present application. The remote terminal can be used to implement a method for controlling the UAV of the present application.

As shown in FIG. 2, the remote terminal 100 includes a memory 103, which stores software programs such as a software program corresponding to the method for controlling the UAV according to an embodiment of the present application. The software program may include a plurality of instructions executable by a processor 106. The processor 106 is coupled to the memory 103 via a memory controller 104, so as to read the software program(s) stored in the memory 103, or write other types of data into the memory 103. The processor 106 may execute the software program(s) to implement various functions and data processing, such as the method for controlling the UAV according to embodiments of the present application. The memory 103 may also receive and store other types of data under the control of the memory controller 104. The memory 103 may be a non-transitory storage medium, e.g. a Random Access Memory (RAM), a Read Only Memory (ROM), a Programmable ROM (PROM), an Erasable PROM (EPROM) or an Electric EPROM (EEPROM). In some embodiments, the processor 106 may be an integrated circuit (IC) chip with signal and data processing functionality. The processor 106 may be a general-purpose processor such as a Central Processing Unit (CPU) or a network processor, or dedicated logics such as a Digital Signal Processing (DSP) logics, an Application Specific IC (ASIC), a Field Programmable Gate Array (FPGA) or the like.

The remote terminal 100 further includes a peripheral interface 108 coupled to the processor 106 and/or the memory controller 104. The peripheral interface 108 can be coupled to various peripheral devices such as a communication module 110, an audio device 112 such as a microphone or a speaker, an input/output (I/O) device 114, the touch screen 102 and etc. The physical input device 101 for receiving user's actions is also coupled to the peripheral interface 108 so as to transmit the received user's actions to the processor 106 through the peripheral interface 108.

In some other embodiments, various motion detecting devices can be integrated within the remote terminal 100, which are used to detect the motion status of the remote terminal 100 and generate one or more motion parameters indicative of the detected motion status of the remote terminal 100. For example, the motion detecting devices may include an inertial measurement sensor, an attitude sensor, an ultrasound transducer, an infrared sensor, an optical sensor, and any other suitable motion detecting devices. The motion parameters of the remote terminal 100 may include, without limitation, position, attitude, velocity, speed, acceleration or orientation of the remote terminal 100, or change in position, attitude, velocity, speed, acceleration or orientation of the remote terminal 100. The detected motion status of the UAV 100 may be transmitted to the processor 106 and/or stored in the memory 103 for subsequent processing. For example, the detected motion status of the remote terminal 100 may reflect actions and gestures of how the operator holds the remote terminal.

The communication device 110 enables the remote terminal 100 to communicate with the UAV 200 via the wireless communication 250 shown in FIG. 1. In some embodiments, the communication device 110 may have video communication functionality to receive from the UAV image data or video data. The communication device 110 may include any number of transmitters, receivers and/or transceivers suitable for wireless communication. The communication may be one-way communication. Preferably, the communication may be two-way communication, such that data can be transmitted in both directions between the remote terminal 100 and the UAV 200.

It should be noted that, although the various peripheral devices are shown coupled to the processor 106 and/or the memory controller 104 via the peripheral interface 108, one or more of the peripheral devices may be coupled to the processor 106 and/or the memory controller 104 directly without the peripheral interface 108 according to some embodiments. For example, the touch screen 102 may be coupled to the processor 106 via a separate video data interface (not shown).

Figure 3:
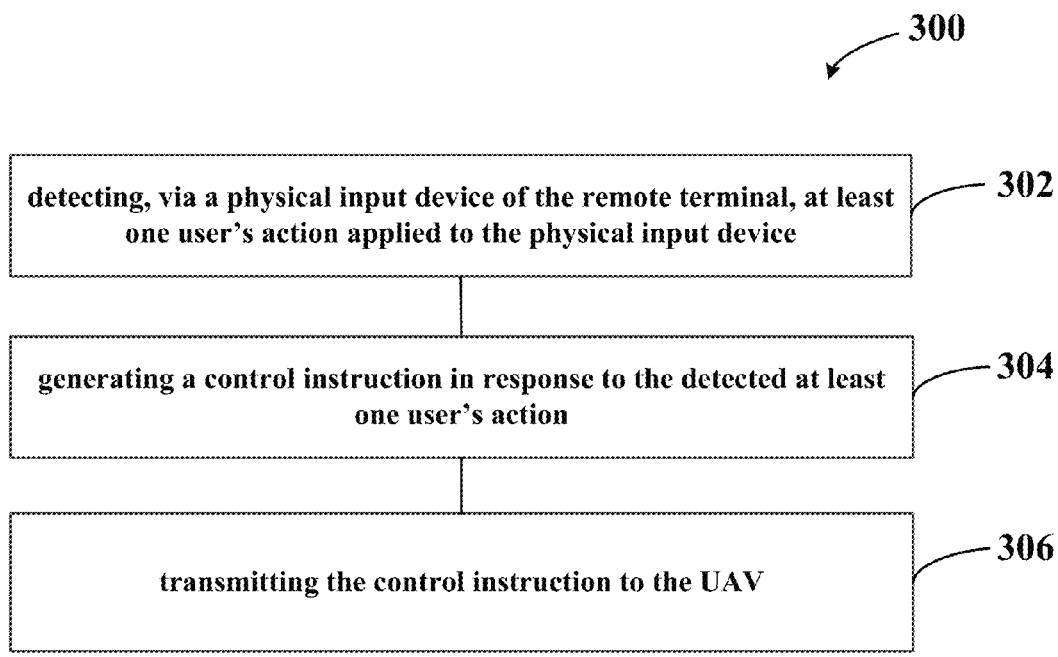
FIG. 3 shows a flow chart of a method 300 for controlling a UAV using a remote terminal according to an embodiment of the present application.

FIG. 3 shows a flow chart of a method 300 for controlling a UAV using a remote terminal according to an embodiment of the present application. The remote terminal may be the remote terminal 100 shown in FIGS. 1 and 2, for example, which has one or more physical input devices and capable of transmitting control instructions to the UAV for UAV control.

In the following specific embodiment, the method 300 is exemplarily described with reference to a physical input device having volume adjusting functionality, i.e. having a volume increase key and a volume decrease key. It should be noted that the operation of the method 300 implemented with other types of physical input devices such as the power on/off key, the home key, and/or the screen-locking key can be similar and thus not elaborated herein.

As shown in FIG. 3, the method 300 starts with Step 302, it is detected via a physical input device of the remote terminal that at least one user's action is applied to the physical input device.

Specifically, the detection of user's actions might be implemented by a predetermined module, program, application or function of the remote terminal. Such predetermined module, program, application or function may be enabled or active as long as the remote terminal is powered on, such that the status of the physical input device can be continuously monitored. In some examples, if the user's action has been detected, a corresponding program may be called to enable a corresponding function. For example, when a key of the physical input device is pressed by the user, a first program "onKeydown" may be called through an Application Program Interface (API) of the remote terminal to indicate the corresponding user's action and start the corresponding function. Furthermore, when the key is released by the user, a second program "onKeyup" may be called similarly. It should be noted that in some embodiments, the programs for monitoring the status of the physical input devices may be key-specific, e.g. each key has a corresponding program. In some other embodiments, however, these programs may be generic to all the keys of the physical input device, and thus identifiers for identifying respective keys may be provided to indicate which key(s) is under operation.

The user's action applied to the physical input device may include a single short-press action, a single long-press action or a combination of the short-press action and/or the long press action.

In some embodiments, the short-press action may be a press action shorter than 0.5 second, while the long-press action may be a press action longer than 2 seconds, e.g. 3 to 5 seconds. For example, for a specific key such as the volume increase key, if the second program "onKeyup" is called within 0.5 second from the first program "onKeydown" is called, then the remote terminal may determine that a short-press action on the volume increase key is detected. Furthermore, for the volume increase key, if the second program "onKeyup" is called after 3 seconds from the first program "onKeydown" is called, then the remote terminal may determine that a long-press action on the volume increase key is detected. If a second or more user's actions are detected within a predetermined period after a first user's action is detected, the remote terminal may determine the detection of a combination of the short-press action and/or the long press action. The predetermined period may be, for example, 0.5 to 2 seconds. For example, if a second short-press action is detected 1 second after a first short-press action is detected, then the remote terminal determines that a combination of two short-press actions, i.e. a double short-press action, has been detected. The number of the combined user's actions recognizable by the remote terminal may be more than two, for example, three, four or even more.

The combined user's actions may also include some examples where two or more keys of the physical input device are pressed simultaneously. For example, a short-press action or a long-press action may be applied to the volume increase key while a single short-press or a long-press action may be applied to the volume decrease key. In some examples, if calling of the program "onKeydown" for the volume increase key is conducted between callings of the programs "onKeydown" and "onKeyup" for the volume decrease key, then the remote terminal may determine that the volume increase key and the volume decrease key are pressed simultaneously. In some other examples, if the second program "onKeyup" is called for the volume increase key within a short period (e.g. 0.5 second) after the first program "onKeydown" for the volume decrease key is called, then the remote terminal may determine that the volume increase key and the volume decrease key are pressed simultaneously.

Furthermore, the combined user's actions may also include some examples where two or more keys of the physical input device are pressed sequentially. For example, a short-press action or a long-press action may be applied to the volume increase key after a single short-press or a long-press action has been applied to the volume decrease key. In some examples, if the second program "onKeyup" is called for the volume increase key within a relative long period (e.g. 0.5 to 2 seconds) after the first program "onKeydown" for the volume decrease key is called, the remote terminal may determine that the volume increase key and the volume decrease key are pressed sequentially.

It can be seen that the number of the combination of user's actions significantly increases if the user's actions on different keys can be detected, which is useful when the keys of the physical input device is limited, for example, in case that the remote terminal is a touch screen mobile phone which has only sound volume adjusting keys and a power on/off key.

Next, in Step 304, a control instruction is generated in response to the detected at least one user action.

Specifically, after the detection of the user's actions by the physical input device, the remote terminal may convert the detected at least one user action into an input event using an internal program or function. The input event may indicate that what action(s) has been applied to which keys.

TABLE 1

Exemplary Input Event List

| Input Event Number | Input Event Content |
|---|---|
| Input Event I | single short-press + volume increase key |
| Input Event II | single short-press + volume decrease key |
| Input Event III | double short-press + volume increase key |
| Input Event IV | double short-press + volume decrease key |

TABLE 1-continued

Exemplary Input Event List

| Input Event Number | Input Event Content |
|---|---|
| Input Event V | single short-press + volume decrease & increase keys |
| Input Event VI | single short-press + volume decrease key after single short-press + volume increase key |
| Input Event VII | single short-press + volume increase key after single short-press + volume decrease key |
| Input Event VIII | single long-press + volume increase key |
| Input Event IX | single long-press + volume decrease key |

Table 1 shows an exemplary input event list. The list illustrates several possible combinations of actions that could be applied to the volume increase and/or decrease keys and recognized by the remote terminal.

In some examples, a single user's action, either the short-press action or long-press action, can be applied to one of the keys of the physical input device. For example, Input Event I indicates that a single short-press action is applied to the volume increase key, and Input Event II indicates that a single short-press action is applied to the volume decrease key, as is shown in Table I. Similarly, Input Event VIII indicates that a single long-press action is applied to the volume increase key, and Input Event IX indicates that a single long-press action is applied to the volume decrease key. Such actions are simple and easy to implement for the user, and thus control instructions that are frequently used can be assigned to such input events. For example, the control instructions of linear movement of the UAV may be assigned to Input Event I or II.

In some other examples, a combination of two or more user's actions can be applied to one of the keys of the physical input device. For example, Input Event III indicates that a double short-press action (i.e. two short-press actions) is applied to the volume increase key, and Input Event IV indicates that a double short-press action is applied to the volume decrease key, as is shown in Table I. It should be noted that, the input events listed in Table I is exemplary only, for example, three or more short-press actions, or one or more short-press actions and one or more long-press actions can also be applied to one of the keys.

In some further examples, the combination of two or more user's actions can be applied to the two volume adjusting keys, either simultaneously or sequentially. For example, as shown in Table I, Input Event V indicates that two simultaneous combined short-press actions are applied to the volume increase key and the volume decrease key, i.e. the volume increase key and the volume decrease key are pressed by the user at the same time. Furthermore, Input Event VI indicates that a short-press action is applied to the volume increase key after a short-press action has been applied to the volume decrease key, and Input Event VII may indicates that a short-press action is applied to the volume decrease key after a short-press action has been applied to the volume increase key. Such combined actions are relatively more complex and may take more time for the user to implement. Thus, some control instruction that are not frequently used during the flight of the UAV can be assigned to or associated with such input events. For example, the control instructions of landing or taking-off the UAV may be assigned to Input Event V.

It should be noted that the input events listed in Table 1 is for illustration only, and in applications, the content of the input events (e.g. how to combine the short/long-press actions and the keys of the physical input device) can be configured by the developer, provider or user of the remote terminal.

Afterwards, the remote terminal may further convert the input event into a control instruction. The conversion from the input event into the control instruction may be implemented with a look-up table, as is shown in Table II.

TABLE II

Exemplary Relationships between Input Event and Control Instructions

| Input Event | Control Instruction |
|---|---|
| Input Event I | Upward movement of the UAV |
| Input Event II | Downward movement of the UAV |
| Input Event III | Clockwise rotation of the UAV |
| Input Event IV | Counterclockwise rotation of the UAV |
| Input Event V | Clockwise rotation of the payload relative to the UAV |
| Input Event VI | Counterclockwise rotation of the payload relative to the UAV |
| Input Event VII | UAV moving 0.5 meter upward and rotating 30 degrees clockwise |

As an example, if the remote terminal identifies that an Input Event II has been generated or obtained, then it may further convert the input event into a control instruction of clockwise rotation of the UAV, according to the relationships listed in Table II.

It should be noted that the control instruction are exemplary, not exclusive. The control instruction can be any types of instruction that is related with the operation of the UAV and certain components thereof. In some embodiments, the control instruction may be selected from a group of control instructions including: flight control instructions for permitting linear or rotatory movement of the UAV, camera adjusting control instructions for permitting linear or rotatory movement of an image capturing device carried on the UAV, and imaging control instructions for adjusting the state of the imaging capturing device. The flight control instruction may include an upward, downward, forward, backward, leftward or rightward linear movement of the UAV, a clockwise or counterclockwise rotatory movement of the UAV along its pitch, roll or yaw axis, a hovering instruction, a take-off instruction or a landing instruction. The camera adjusting control instructions may include an upward, downward, forward, backward, leftward or rightward linear movement of the image capturing device carried on the UAV relative to the main body of the UAV, or a clockwise or counterclockwise rotatory movement of the image capturing device along its pitch, roll or yaw axis relative to the main body of the UAV. The imaging control instructions may include, for example, enabling or disabling an image capturing or video capturing function of the image capturing device carried by the UAV, or switching an operation mode of the image capturing device (e.g. between picture capturing and video capturing).

Furthermore, in some embodiments, an input event may correspond to a combination of control instructions. For example, as shown in Table II, Input Event VII corresponds to a combination of a first control instruction of moving the UAV 0.5 meter upward and a second control instruction of rotating the UAV 30 degrees clockwise. Such configuration further facilitates the control of the UAV using the remote terminal.

The relationships between the input events and the control instructions may be configurable by the user. For example, the user may download via wireless communication (e.g. Bluetooth communication, Wi-Fi communication) or wired communication (e.g. via a USB connection) a look-up table with desired relationships to the remote terminal from an external computer or an external smart device such as a mobile phone or a tablet computer. Alternatively, the look-up table stored in the remote terminal may be editable by the user to change the relationships contained therein.

In some embodiments, the conversion from the input events into the control instructions may depend on some other factors, such as an attitude of the remote terminal.

Figure 4A:
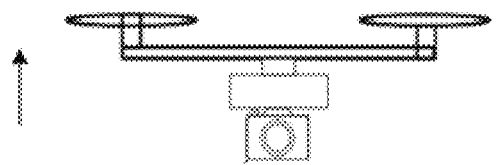
FIGS. 4A to 4D show respective movements of a UAV when a remote terminal having different attitudes receives a user's action, according to an embodiment of the present application.
Figure 4A:
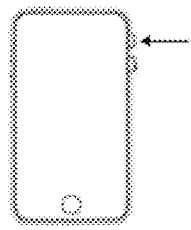
Figure 4B:
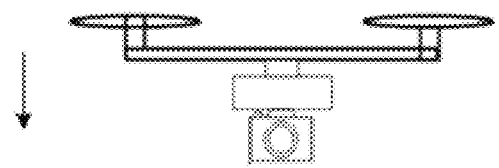
Figure 4B:
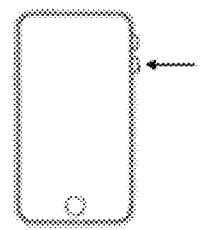
Figure 4C:
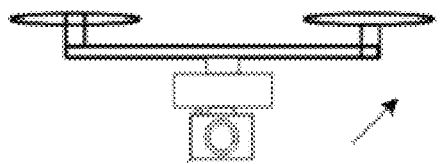
Figure 4C:
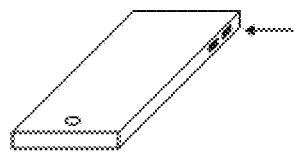
Figure 4D:
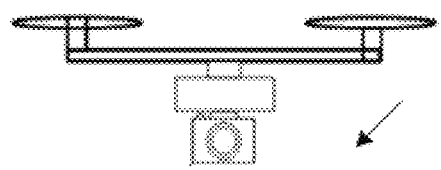
Figure 4D:
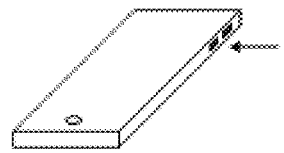

For example, the remote terminal may detect, via a motion detecting device of the remote terminal, the attitude of the remote terminal when the user's action is detected being applied to the physical input device. The remote terminal may then convert the input event into the control instruction based on the attitude of the remote terminal. In some embodiments, the input event may be converted into a flight control instruction for permitting the UAV to move substantially along an axis based on the attitude of the remote terminal, or to rotate substantially about the axis based on the attitude of the remote terminal. The axis is determined in relation to the attitude of the remote terminal, for example, a pitch, roll or yaw axis of the remote terminal. In some example, the axis may be in parallel with a virtual line extending along the body of the remote terminal, for example, a virtual line connecting the volume increase key and the volume decrease key. In this way, when the motion detecting device detects that the remote terminal is substantially vertically held by the user, then the user's action on the volume increase key (generally positioned above the volume decrease key) may lead to an upward movement of the UAV (shown in FIG. 4A) and the user's action on the volume decrease key may lead to a downward movement of the UAV (shown in FIG. 4B). Similarly, when the motion detecting device detects that the remote terminal is substantially horizontally held by the user, then the user's action on the volume increase key may lead to a forward movement of the UAV (shown in FIG. 4C) and the user's action on the volume decrease key may lead to a backward movement of the UAV (shown in FIG. 4D).

Next, in Step 306, the control instruction generated in Step 304 is transmitted to the UAV. Then the UAV may receive and follow such control instruction and operate accordingly.

It should be noted that, as described above, the keys of the physical input devices of the remote terminal may have respective predetermined functions defined by the operating system of the remote terminal, which may be different from the control instructions or functions assigned to the user's actions according to the embodiments of the present application. Thus, the present invention might need to interact with the operating system as well as other user applications running on the remote terminal, so as to utilize (exclusively or non-exclusively) the physical inputs that are also used by other applications or functions. For good user experience as well as data privacy concerns, such a usage of physical inputs by UAV might need user's specific permission.

In practice, the remote terminal may provide or transmit the control instructions generated in Step 304 only when the corresponding UAV program, software of application for implementing the method of the present application is running on the remote terminal, for example, when a user interface of the program, software or application is displayed in a screen of the remote terminal. If the remote terminal exits or is interrupted from such UAV program, software or application, the operating system originally defined functions may be active again for the physical keys. Thus, the method for controlling the UAV of the present application would not affect the normal operation of the remote terminal or the operation of other applications of the remote terminal.

From the foregoing, the physical input device can detect the user's actions with higher reliability, speed and accuracy, and is more resistant to severe environment, which makes the operation of the UAV using the remote terminal more convenient and easier. Also, the user may assign some complicated control instructions with some simple user's action(s), which further improves the convenience of controlling the UAV using the remote terminal.

Those skilled in the art may understand and implement other variations to the disclosed embodiments from a study of the drawings, the present application, and the appended claims. In the claims, the word "comprising" does not exclude other elements or steps, and the indefinite article "a" or "an" does not exclude a plurality. In applications according to present application, one element may perform functions of several technical feature recited in claims. Any reference signs in the claims should not be construed as limiting the scope. The scope and spirit of the present application is defined by the appended claims.

What is claimed is:

1. A method for controlling a UAV using a remote terminal, wherein the remote terminal is capable of wirelessly communicating with the UAV, and the method comprises:
    detecting, via a physical input device of the remote terminal, at least one user's action applied to the physical input device, wherein the physical input device comprises at least two physical keys arranged in a linear array;
    generating a control instruction in response to the detected at least one user's action; and
    transmitting the control instruction to the UAV;
    wherein the step of generating the control instruction comprises: converting the detected at least one user's action into an input event; and converting the input event into the control instruction;
    and wherein the step of converting the input event into the control instruction comprises: detecting, via a motion detecting device of the remote terminal, an attitude of the remote terminal; and converting the input event into the control instruction based on the attitude of the remote terminal;
    and wherein the input event is converted into a flight control instruction for permitting the UAV to move substantially along an axis based on the attitude of the remote terminal, or to rotate substantially about the axis based on the attitude of the remote terminal, wherein the axis is in parallel with a virtual line connecting the at least two physical keys and changing with the attitude of the remote terminal.

2. The method of claim 1, wherein the at least two physical keys are selected from the group consisting of: sound volume adjusting keys, power on/off key, home key, and screen-locking key.

3. The method of claim 2, wherein the at least two physical keys are a volume increase key and a volume decrease key.

4. The method of claim 1, wherein the at least one user's action is selected from the group consisting of: a single short-press action, a single long-press action, and a combination of the short-press action and the long-press action.

5. The method of claim 4, wherein the at least one user's action comprises two or more actions applied to one of the at least two physical keys sequentially.

6. The method of claim 4, wherein the at least one user's action comprises two or more actions applied to two or more of the at least two physical keys simultaneously.

7. The method of claim 1, wherein the control instruction is selected from a group of control instructions comprising: flight control instructions for permitting linear or rotatory movement of the UAV, camera adjusting control instructions for permitting linear or rotatory movement of an image capturing device carried on the UAV, and imaging control instructions for adjusting a state of the imaging capturing device.

8. The method of claim 1, wherein a relationship between the control instruction and the at least one user's action is configurable by a user.

9. A remote terminal for controlling a UAV, wherein the remote terminal is capable of wirelessly communicating with the UAV, and the remote terminal comprises:
   a physical input device for detecting at least one user's action applied thereto, wherein the physical input device comprises at least two physical keys arranged in a linear array;
   a processor for generating a control instruction in response to the detected at least one user's action;
   a motion detecting device for detecting an attitude of the remote terminal; and
   a communication device for transmitting the control instruction to the UAV;
   wherein the processor is further configured to convert the detected at least one user's action into an input event and to convert the input event into the control instruction;
   and wherein the processor is further configured to convert the input event into the control instruction based on the attitude of the remote terminal; and wherein the input event is converted into a flight control instruction for permitting the UAV to move substantially along an axis based on the attitude of the remote terminal, or to rotate substantially about the axis based on the attitude of the remote terminal, wherein the axis is in parallel with a virtual line connecting the at least two physical keys and changing with the attitude of the remote terminal.

10. The remote terminal of claim 9, wherein the at least two physical keys are selected from the group consisting of: sound volume adjusting keys, power on/off key, home key, and screen lock key.

11. The remote terminal of claim 10, wherein the at least two physical keys are a volume increase key and a volume decrease key.

12. The remote terminal of claim 9, wherein the at least one user's action is selected from the group consisting of: a single short-press action, a single long-press action, and a combination of the short-press action and the long-press action.

13. The remote terminal of claim 12, wherein the at least one user's action comprises two or more actions applied to one of the at least two physical keys sequentially.

14. The remote terminal of claim 12, wherein the at least one user's action comprises two or more actions applied to two or more of the at least two physical keys simultaneously.

15. The remote terminal of claim 9, wherein the control instruction is selected from a group of control instructions comprising: flight control instructions for permitting linear or rotatory movement of the UAV, camera adjusting control instructions for permitting linear or rotatory movement of an image capturing device carried on the UAV, and imaging control instructions for adjusting a state of the imaging capturing device.

16. The remote terminal of claim 9, wherein a relationship between the control instruction and the at least one user's action is configurable by a user.

\* \* \* \* \*